Figure 1:
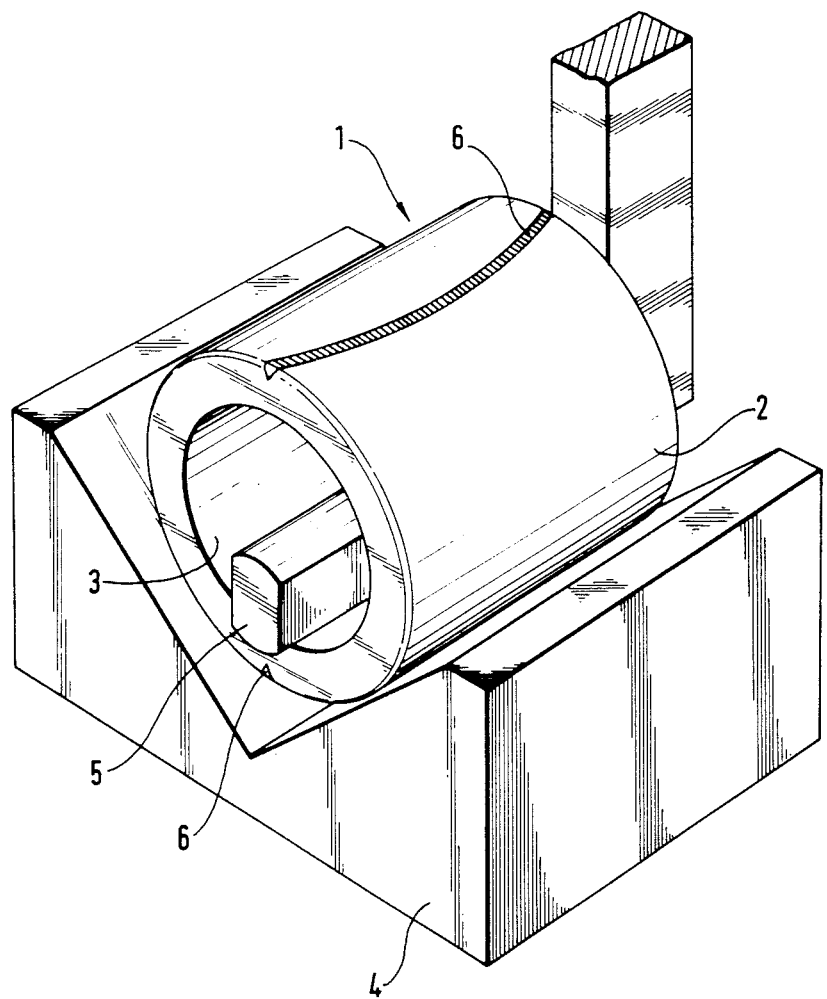

United States Patent [19]

Simon et al.

[11] Patent Number: 4,821,386
[45] Date of Patent: Apr. 18, 1989

[54] METHOD OF PRODUCING A ROLLING BEARING RACE

[75] Inventors: Michael Simon, Herzogenaurach; Werner Kreiss, Erlangen, both of Fed. Rep. of Germany

[73] Assignee: INA Walzlager Schaeffler KG, Fed. Rep. of Germany

[21] Appl. No.: 30,695

[22] Filed: Mar. 25, 1987

[30] Foreign Application Priority Data

Apr. 26, 1986 [DE] Fed. Rep. of Germany ....... 3614246

[51] Int. Cl.⁴ .............................................. B21D 53/10
[52] U.S. Cl. .................. 29/149.5 C; 29/413; 219/121.35; 219/121.85
[58] Field of Search ................ 29/148.4 C, 149.5 L, 29/413, 414, 416; 437/173; 219/121 LM, 121 LG, 121 LN, 121 LF; 225/2, 93.5, 96, 103

[56] References Cited

U.S. PATENT DOCUMENTS

| | | | |
|---|---|---|---|
| 2,624,105 | 1/1953 | Virtue | 29/149.5 R X |
| 2,648,578 | 8/1953 | Stearns et al. | 29/413 X |
| 3,884,406 | 5/1975 | Bowen | 225/103 |

FOREIGN PATENT DOCUMENTS 2327321 12/1973 Fed. Rep. of Germany .
2145947 4/1985 United Kingdom .

Primary Examiner—P. W. Echols
Assistant Examiner—Andrew E. Rawlins
Attorney, Agent, or Firm—Bierman and Muserlian

[57] ABSTRACT

A method of producing a rolling bearing race provided with a continuous rupture seam along at least one area of its periphery and having a seating surface and a race for rolling elements, the rolling bearing race surface being exposed before rupture along at least a portion of the intended course of the rupture seam to high-energy radiation with the local confines transerve to the intended course of the rupture seam and during rupture the surface area exposed to radiation is subjected to tensile stress by an external force, characterized in that the seating surface (2,8) of the bearing race (1,7) is exposed to the radiation and the external force is exerted as a pressure force onto the raceway surface (3,9) along an area directly opposed to the area (6,10) of the seating surface (2,8) exposed to radiation.

6 Claims, 2 Drawing Sheets

METHOD OF PRODUCING A ROLLING BEARING RACE

BACKGROUND OF THE INVENTION

Methods of making a rolling bearing race provided with a continuous rupture seam along at least one area of its periphery and having a seating surface and a race surface for rolling elements, the rolling seating race surface being exposed before rupture along at least a part of the intended course of the rupture seam to high-energy radiation which radiates transversely within local confines to the intended course of the rupture seam, and, during rupture, the area of the surface exposed to radiation is subjected to tensile load by an external force are known and are used for hardened rolling bearing races. These methods are based on the penetration of high-energy radiation to create locally within the texture of the rolling bearing race an extreme brittleness acting as a quasi "inner groove" along which the rolling bearing race is split by the influence of an external force which is especially small when acting on the rolling bearing race so that the area of its surface exposed to radiation is subjected to tensile load. Such a method is known (DE-OS No. 3,425,829, FIG. 1) and has been proven commercially. However, the occasional chipping off of material from the running surface during rupture along the rupture seam so that the respective bearing race became useless is a disadvantage thereof.

OBJECTS OF THE INVENTION

It is an object of the invention to provide a method of this type wherein a chipping off of material from the running surface in the area of the rupture seam during rupture is prevented.

This and other objects and advantages of the invention will become obvious from the following detailed description.

THE INVENTION

The method of producing a rolling bearing race provided with a continuous rupture seam along at least one area of its periphery and having a seating surface and a raceway surface for rolling elements, the rolling bearing race surface being exposed before rupture along at least a portion of the intended course of the rupture seam to high-energy radiation with the local confines transverse to the intended course of the rupture seam and during rupture the surface area exposed to radiation is subjected to tensile stress by an external force is characterized in that the sealing surface (2,8) of the bearing race (1,7) is exposed to the radiation and the external force is exerted as a pressure force onto the raceway surface (3,9) along an area directly opposed to the area (6,10) of the seating surface (2,8) exposed to radiation. It has been shown that such a method prevents the described chipping off with high certainty, and best results are achieved when the line of impact of the pressure force extends precisely through the intended curve of the rupture seam.

According to a feature of the invention, the high-energy radiation acted upon the seating surface is a laser beam or electron beam.

In a modification of the invention, a method of making an outer rolling bearing race split at two diametrically opposed areas of its periphery provides that the seating surface is exposed to the radiation so that the depth of penetration of the radiation is at least 30 percent of the wall thickness of the bearing race. Advantageously, this results in the desired lemon shape of the split outer roller bearing races during rupture, i.e. both halves of the roller bearing race having a slightly increasing radius of curvature toward the rupture seams. In the assembled state of the roller bearing race, the occurrence of irregularities in the raceway surface in the area of the rupture seam and thus resulting disturbed run of the roller elements is prevented.

Figure 2:
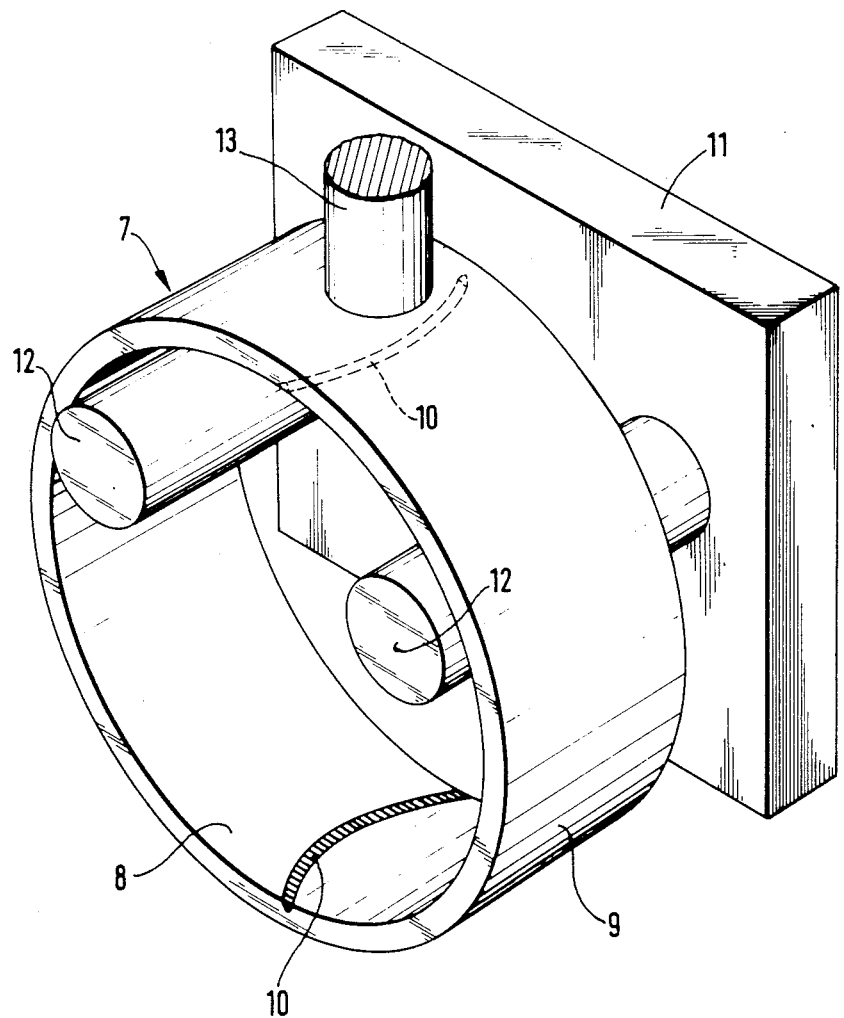

Referring now to the drawings:

FIG. 1 is a perspective illustration of rupture of an outer bearing race by the method of the invention and FIG. 2 shows a perspective illustration of rupture of an inner bearing race by the method of the invention.

FIG. 1 shows an outer roller bearing race 1 having seating surface 2 and a raceway surface 3 which is to be split in two half shells by rupture along two diametrically opposed areas of its periphery. For that purpose, the outer roller bearing race 1 which is supported in a prism 4 and acted upon by a stamping tool 5 exerting an external force thereon for achieving the rupture is exposed along the intended course 6 of the rupture seam to a laser beam radiating within local confines transversely to the course 6 to create preferred points of fracture.

While thus the seating surface 2 is exposed to the laser beam, the raceway surface 3 of the outer roller bearing race 1 is acted upon by the external force which is a pressure force exerted by the stamping tool 5. The outer roller bearing race 1 is aligned with the stamping tool 5 so that the pressure force is exerted on the raceway surface 3 at the area which is directly opposed to the area of the seating surface 2 exposed to radiation and thus subjected to tensile load during rupture. Then, the outer roller bearing race 1 is aligned in the prism 4 so that the other area of the bearing surface 2 i.e. in FIG. 1 the upper area exposed to the radiation, is split in the described manner.

If the laser beam acts upon the bearing surface 2 of the outer roller bearing race 1 so that the depth of penetration of the laser radiation is at least 30 percent of the wall thickness of the roller bearing race 1 and the race is split in the described manner, minor plastic deformations are obtained in the area of the rupture seams resulting in a small increase of the radius of curvature of the obtained half shells toward the rupture seams so that the split outer roller bearing race 1 has the desired lemon shape.

FIG. 2 illustrates an inner roller bearing race 7 having a seating surface 8 and a raceway surface 9 and is to be provided with rupture seams along two diametrically opposed areas of its periphery. For that purpose, the seating surface 8 is exposed to a laser beam along the intended course 10 of the rupture seams and the seating surface 8 of the inner roller bearing race 7 is supported by two posts 12 attached to a frame 11. A stamping tool 13 exerts a pressure force onto the raceway surface 9 of the roller bearing race 7. As shown in FIG. 2, the inner roller bearing race 7 is aligned with the stamping tool 13 so that the line of impact of the pressure force extends through the area of the seating surface 8 exposed to the laser beam so as to be subjected to tensile load by the pressure force during rupture.

It should be noted that the bursting seam can be of any suitable shape. It may extend e.g. in the direction of the longitudinal axis or also be inclined to the latter and it may also be arc-shaped or arrow-shaped.

Various modifications of the method of the invention may be made without departing from the spirit or scope thereof and it should be understood that the invention is intended to be limited only as defined in the appended claims.

What I claim is:

1. A method of producing a rolling bearing race provided with a continuous rupture seam along at least one area of its periphery and having a seating surface and a raceway surface for rolling elements, the seating surface being exposed before rupture along at least a portion of the intended course of the rupture seam to high-energy radiation within confined limits transverse to the intended course of the rupture seam and during rupture the surface area exposed to radiation is subjected to tensile stress by an external force, characterized in that the seating surface (2,8) of the bearing (1,7) is exposed to the radiation and the only external force exerted to rupture the roller bearing race is a pressure force exerted onto the raceway surface (3,9) along an area directly opposed to the area (6,10) of the seating surface (2,8) exposed to radiation.

2. The method of claim 1 wherein the high-energy radiation acting upon the seating surface (2,8) is a laser beam.

3. The method of claim 1 wherein the high-energy radiation acting upon the seating surface (2,8) is an electron beam.

4. The method of claim 2 for making an outer rolling bearing race having two diametrically opposed rupture seams wherein the seating surface (2,8) is exposed before rupture to radiation so that the depth of radiation penetration is at least 30% of the wall thickness of the bearing race (1,7).

5. The method of claim 3 for making an outer rolling bearing race having two diametrically opposed rupture seams wherein the seating surface (2,8) is exposed before rupture to radiation so tht the depth of radiation penetration is at least 30% of the wall thickness of the bearing race (1,7).

6. A method of producing an outer rolling bearing race provided with two diametrically opposed continuous rupture seams along at least one area of its periphery and having a seating surface and a raceway surface for rolling elements, the rolling bearing race being exposed before rupture along at least a portion of the intended course of the rupture seam to high-energy radiation within confined limits transverse to the intended course of the rupture seam and during rupture the surface area exposed to radiation is subjected to tensile stress by an external force, characterized in that the seating surface (2,8) of the bearing race (1,7) is exposed to the radiation so that the depth of radiation penetration is at least 30% of the wall thickness of the bearing race (1,7) and the external force is exerted as a pressure force onto the raceway surface (3,9) along an area directly opposed to the area (6,10) of the seating surface (2,8) exposed to radiation.

* * * * *